United States Patent

[11] 3,624,457

| [72] | Inventor | Claude-Edmond Lombard<br>Billancourt, France |
| --- | --- | --- |
| [21] | Appl. No. | 62,124 |
| [22] | Filed | Aug. 7, 1970 |
| [45] | Patented | Nov. 30, 1971 |
| [73] | Assignees | Regie Nationale des Usines Renault<br>Billancourt, France;<br>Societe Industrielle et Commerciale des<br>Automobiles Peugeot<br>Paris, France |
| [32] | Priority | Nov. 9, 1966 |
| [33] | | France |
| [31] | | 83148 |
| | | Continuation of application Ser. No.<br>675,979, Oct. 17, 1967. This application<br>Aug. 7, 1970, Ser. No. 62,124 |

[54] METHOD OF STANDARDIZING THE OUTPUT VOLTAGE OF PERMANENT MAGNET CONTROL ALTERNATORS
4 Claims, 3 Drawing Figs.

[52] U.S. Cl. .................................................. 317/157.5,
 324/163, 73/2
[51] Int. Cl. .................................................. H01f 13/00,
 H02p
[50] Field of Search .................................... 317/157.5;
 324/161, 163, 173, 174; 73/2

[56] References Cited
UNITED STATES PATENTS

| 3,327,802 | 6/1967 | Peras | 322/52 |
| --- | --- | --- | --- |
| 3,396,325 | 8/1968 | Hopkins | 322/51 |
| 1,611,089 | 12/1926 | Wallis | 324/161 |
| 2,046,111 | 6/1936 | Ely et al. | 317/157.5 |
| 2,285,006 | 6/1942 | Bowser | 324/163 |
| 2,516,114 | 7/1950 | Green | 324/163 |
| 2,810,867 | 10/1957 | Gilbert | 317/157.5 |
| 3,319,164 | 5/1967 | Johnson et al. | 324/173 |

Primary Examiner—L. T. Hix
Attorney—Stevens, Davis, Miller & Mosher

ABSTRACT: This application relates to a method of standardizing tachometric control alternators by demagnetizing to a standard level the permanent magnets of the armature. The armature containing permanent magnets revolves in or in front of a stator having one or more windings. The standardization is effected by rotating the permanent magnet armature at a standard speed while flowing a 50-cycle current of increasing intensity through the field windings. The permanent armature is revolved at a speed such that the frequency it generates is different from the one supplied to the windings. When the magnets have been demagnetized to the desired standard level, the control alternator is ready for use.

PATENTED NOV 30 1971 3,624,457

INVENTOR
CLAUDE EdMONd LOMBARD
By Stevens, Davis, Miller & Mosher
ATTORNEYS

METHOD OF STANDARDIZING THE OUTPUT VOLTAGE OF PERMANENT MAGNET CONTROL ALTERNATORS

This application is a continuation of application Ser. No. 675,979, filed Oct. 17, 1967.

This invention relates to a method of standardizing the output voltage of a permanent magnet control alternator.

Tachometric alternators are already known wherein the armature consists of a multipole permanent magnet. These alternators, in addition to this armature, also comprise a stator enclosing a field winding and consisting of an annular member surrounding the armature of disposed in front thereof; this annular member is provided with teeth directed alternately in opposite directions, these teeth being curved to enclose the windings and constitute a cage for the armature.

Alternators of this general type have been described in detail in prior patents filed by Regie Nationale des Usines Renault, more particularly U.S. Pat. Nos. 3,327,802; 3,344,294; and 3,442,135. Such alternators are used to supply an information parameter concerning the speed of the engine or of the vehicle to a device which controls the automatic change from one gear ratio to another in the case of an automotive vehicle.

The alternators described and illustrated in the above-mentioned patents are advantageously provided with a movable element whereby the output voltage can be varied according to the position of the accelerator control, this movable element consisting, for example, of the stator or armature adapted to slide axially, or of one or more stator teeth adapted to be rotated through a limited amplitude.

However, the interchangeability of these alternators is highly desirable and therefore they must be capable of delivering the same output voltage for a same output speed, and a same position, if possible, of the above-defined movable element as a function of the load applied to the engine of the vehicle.

It is already known to demagnetize a permanent magnet to bring the output voltage to a desired value for a given rotational speed. It is an object of the present invention to provide a specific demagnetizing method characterized in that an increasing current from a source such as a 50-cycle current which is standard in Europe as the distribution secondary (house current) is fed to the field windings of the alternator. The permanent magnet armature is rotated at such a speed that its output frequency differs from that fed to the field windings. The circuit to the field windings is periodically disconnected from the 50-cycle source and switched to a measuring instrument which indicates the output of the alternator at the standard speed of the armature. This indicates the degree of demagnetization which has been achieved, and this same equipment brings about the end of the demagnetizing operation when the desired output voltage of the alternator has been achieved.

Finally, in the case of a movable-element alternator, this element, whether the stator or the movable portion of the poles, must be brought to the position corresponding to the maximum load applied to the vehicle engine (fully depressed accelerator pedal) and the alternator must be driven at a speed corresponding to that selected for one of the gear changes, preferably the speed corresponding to the gear ratio providing the lowest reduction ratio (provided that this speed does not provide a frequency equal to that of the circuit or in a simple ratio therewith.)

This invention will now be described with reference to the accompanying drawings illustrating its specific application to a six-pole alternator of which the velocity of rotation at the regulating time is 2,400 r.p.m., i.e., 40 r.p.s., giving a frequency of 120 Hz. while the field windings are connected to a 50 Hz. source.

The invention can be further understood in conjunction with the annexed drawings wherein.

Figure 1:
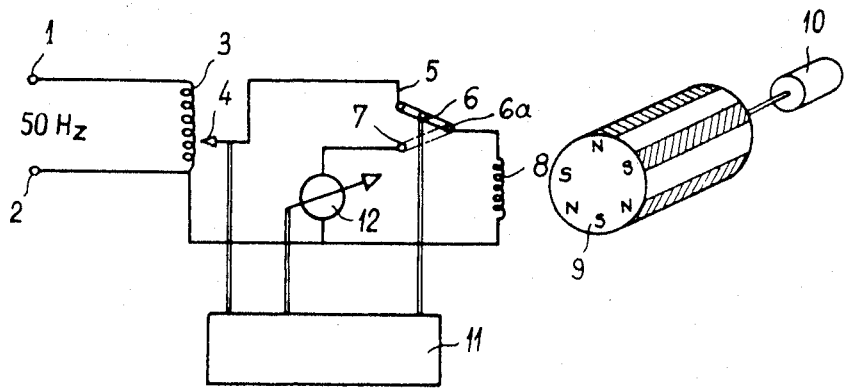
FIG. 1 is a diagrammatic illustration of a demagnetizing device arranged in accordance with the teachings of the present invention.

According to this invention one is able to regulate or standardize the output voltage of an alternator after it is fully assembled. As explained above, the alternator has an armature which is a multipoled permanent magnet of cylindrical configuration, the poles being flush with the cylinder surface. In FIG. 1 the terminals 1 and 2 of a 50-cycle source are connected to a transformer 3 including a motorized sliding contact 4. The 50-cycle voltage is picked up by sliding contact 4 which is connected to the terminal 5 of a switch which has a blade 6 which pivots at 6a for movement between the solid line position shown in FIG. 1 and the broken line position in that figure. In the solid line position of contact blade 6, the circuit to field windings 8 of the alternator is from terminal 1 through the windings 3, sliding contact 4, terminal 5, blade 6, windings 8, back to terminal 2. The multipole magnet of alternator 9 is rotated at a constant speed by a driving motor 10 and the stator poles are set in the position corresponding to the maximum load carried by the vehicle engine, in the case of tachometric alternators designed for controlling automatic change-speed devices. An automatic device 11 is provided for periodically switching the blade 6 to the other fixed contact 7 connected to the voltage-measuring instrument 12 and, as a function of the data displayed by this instrument, it controls the position of said movable sliding contact 4 and therefore the degree of degaussing or demagnetization. This complete assembly can easily be controlled by automatic means for the mass production of elements, notably by using motorized autotransformers or saturable inductances for obtaining the increasing intensity of the mains current.

At the beginning of the magnet degaussing cycle the sliding contact 4 is at zero volt and at the end of the cycle the process is stopped, the sliding contact 4 returning to zero volt when the regulated voltage value is attained. As this cycle has a reversible effect, the magnet degaussing process is unaffected by the return movement of sliding contact 4 and the equipment is thus ready to receive another magnet.

Figure 2:
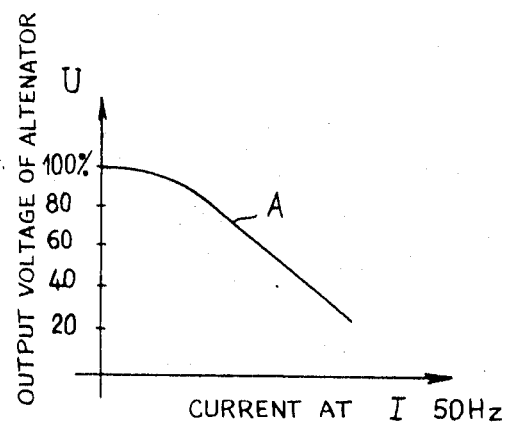
FIG. 2 is a graph plotting a 50-cycle field windings current on the abscissa against the output voltage of the alternator to show how the output voltage capacity of the alternator is reduced as the demagnetizing current is raised to higher levels.

In FIG. 2 there is shown along the ordinate the alternator output voltage in percent of its original value. This ordinate represents what one would see at the dial 12 when the switch member 6 is in the broken line position of FIG. 1. The abscissa indicate the magnitude of the 50-cycle current supplied to the field 8. Thus for a given magnet the characteristic curve A shows the effect of increased current intensity upon output voltage capability of the alternator.

Figure 3:
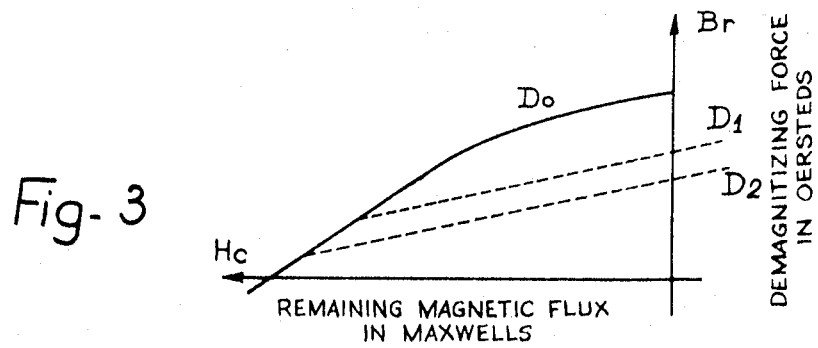
FIG. 3 is another graphic diagram plotting field strength in Maxwells along the abscissa against the demagnetizing flux in oersteds.

In FIG. 3 the abscissa shows the residual magnetic strength of the pole pieces in Maxwells, whereas the ordinate shows the demagnetizing flux in oersteds. The characteristic curve of the material is $Do$. The initial deviation from these values of $Do$ frequently attain 10, 20 and even more percent. After demagnetization one obtains the straight line recovery $D_1$, $D_2$, etc.

Magnets prepared from nickel, aluminum, cobalt in granular form bounded with a suitable plastic material are particularly suited for this degaussing process.

A first stabilization of the magnet is obtained by inserting it into a circuit open in the preassembled condition and submitting the magnet to several temperature cycles; the end stabilization and adjustments are performed with the apparatus in its fully assembled condition; the standard of precision of the resulting regulation may be as high as desired.

What is claimed is:

1. A method for standardizing the output voltage of tachometric control alternators, said alternators having permanent magnet armatures and field windings, comprising the steps of driving the armature at a controlled speed which will generate a current of predetermined frequency different from said predetermined one, periodically interrupting the flow of current to said field windings while measuring the degree of demagnetization of the armature magnets as a function of the output of the alternator, adjusting the magnitude of the current impressed on said field windings until the desired demagnetization is achieved.

2. A method according to claim 1 in which the alternator is inserted in an open circuit for prestabilizing prior to demagnetizing.

3. A method according to claim 1 in which the magnets are submitted to at least one heating cycle at a temperature higher than contemplated service temperatures prior to demagnetizing.

4. A method for standardizing the output voltage of tachometric control alternators used for delivering an information parameter concerning the speed of the vehicle to a device controlling automatic change of gear ratio, said alternators having permanent magnet armatures and a movable pole stator including field windings, comprising the steps of driving the armature at a controlled speed which will generate a current of predetermined frequency, setting the stator poles in a position corresponding to maximum engine load with the accelerator control fully depressed for controlling gear change, impressing on the field windings a current at a frequency different from said predetermined one, periodically interrupting the flow of current to said field windings while measuring the degree of demagnetization of the armature magnets as a function of the output of the alternator, adjusting the magnitude of the current impressed on said field windings until the desired demagnetization is achieved.

* * * * *